United States Patent

[11] 3,622,186

[72] Inventors John F. Newell
 Madison;
 Walter M. Hassenplug, Madison; Reuben
 A. Zahler, Verona, all of Wis.
[21] Appl. No. 880,027
[22] Filed Nov. 26, 1969
[45] Patented Nov. 23, 1971
[73] Assignee Wehr Corporation
 Milwaukee, Wis.

[54] CHEVRON CONNECTOR
 2 Claims, 5 Drawing Figs.
[52] U.S. Cl. ................................ 287/189.36H,
 160/381, 287/54 C
[51] Int. Cl. ........................................ F16b 7/00
[50] Field of Search .............................. 287/189.36
 H, 20.92 R, 20.92 C, 20.92 D, 54 A, 54 B, 54 C;
 52/656; 160/381

[56] References Cited
UNITED STATES PATENTS
3,290,077 12/1966 LaBarge .................. 287/20.92 C
3,294,429 12/1966 Halip .......................... 287/189.36 H
FOREIGN PATENTS
284,017 11/1952 Switzerland ................. 287/189.36 H Primary Examiner—David J. Williamowsky
Assistant Examiner—Wayne L. Shedd
Attorneys—John W. Michael, Gerrit D. Foster, Bayard H. Michael, Paul R. Puerner, Joseph A. Gemignani, Andrew O. Riteris, Daniel Van Dyke and Spencer B. Michael ABSTRACT: Louver frame segments are joined mechanically by a chevron-shaped connector member which is inserted in restricted passages and extends between abutting frame segments. The legs of the connector member have a compound angular relationship in that they are at an angle to each other in addition to the basic angle attributing the chevron shape. The legs have a nonplanar configuration attributed thereto by upset ribs offset toward like edges of their respective legs. The ribs are flattened in the restricted passages to thereby establish a positive wedge connection between the frame segments and, in being flattened, the ribs of each leg generally expand toward each other to form a hair-line joint between the frame segments.

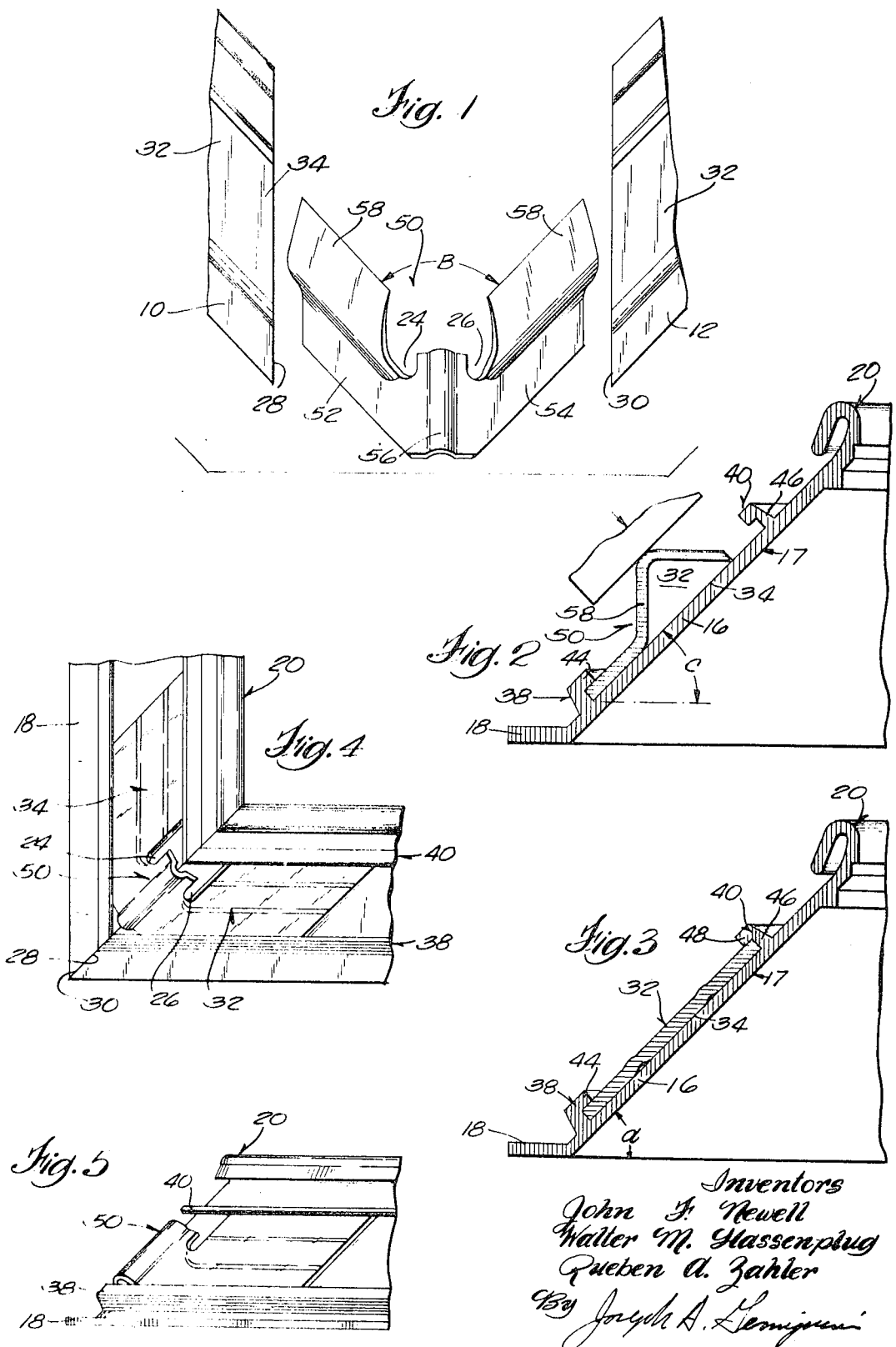

3,622,186

CHEVRON CONNECTOR

BACKGROUND OF INVENTION

This invention relates to connectors for structural members, and, more particularly, to connecting louver frame segments for air diffusers and the like which will be exposed in use.

One prior method of joining structural frame segments has been to weld abutting surfaces of the segments. While this method forms a positive connection, it is undesirable where external appearances are important since the heat applied can cause unsightly blemishes. This is especially true where the frames are made from anodized aluminum and is further aggravated in that a portion of the anodic coating must be removed for welding.

Various types of mechanical methods of connection have been proposed but these too have generally proven to be unsatisfactory for one of two reasons. One, the connector member is usually somewhat complex and expensive to fabricate and install; or two, the methods involve crimping or other deformation of the structural members which affect their external appearance.

SUMMARY OF INVENTION

It is the principal object of this invention is provide a method for positively joining together frame segments of, for example, an air diffuser in a simple and inexpensive manner which does not detract from the esthetic appearance of the frame and which establishes and maintains a tight butt joint between the frame segments.

For achievement of these and other objects, this invention proposes providing the frame segments to be joined with restricted passages for receipt of the connector member. The connector member is generally chevron shaped having legs which have an angular relation therebetween in addition to the basic angular relation attributing the chevron shape. The legs are initially nonplanar having an upset portion offset on each leg to be adjacent a similar edge of each leg of the connector. The legs are inserted in the restricted passages of the frame segments to be joined and abutting one of the walls defining the restricted passage and the upset portion is flattened into engagement with the other wall to thereby provide a positive connection between the frame segments and insure a tight butt joint between the frame segments.

In addition to the basic simplicity of the connection, factory assembly is unnecessary and frame members can be shipped in an unassembled state so that savings in shipment costs can also be realized.

DESCRIPTION OF DRAWINGS

FIG. 1 is an exploded plan view of the connector proposed by this invention prior to its insertion into the frame members;

FIG. 2 is a sectional view of a frame member with the connector member inserted prior to deformation of the connector;

FIG. 3 is a sectional view of a frame member after the connector member has been formed into positive engagement with the crane member;

FIG. 4 is a top plan view of the crane corner after it has been connected in accordance with this invention; and FIG. 5 is a side view of the connection shown in FIG. 4.

DESCRIPTION OF PREFERRED EMBODIMENT

For convenience, the invention will be described as incorporated in an air diffuser frame and can also be used to connect louver segments, but is not limited to such specific use. Only a portion of the frame has been illustrated, and the illustration and description of only one corner of the frame should be sufficient for an understanding of this invention. The remainder of the assembly can take any conventional form well known to those skilled in this particular art and the other corner connections are identical to that illustrated.

In a common, conventional construction, the peripheral louver frame is square or rectangular and is made up of a number of connected frame segments. Portions of two frame segments 10 and 12 are illustrated.

Each frame segment includes body 16 having an exposed face 17 as shown in FIG. 3, face 17 being externally exposed to the room when the diffuser is installed. In addition, each segment includes inner and outer flange portions 18 and 20 extending the length of the frame segment, portion 18 being at an angle "a" (hereinafter referred to as the louver angle) to body 16 such that as the diffuser is installed as a terminal point in a ventilation system, the inner and outer flange portions can also be received as inner and outer sides, respectively, of the connected segments. Flange 18 fits against the ceiling or wall, whichever the case may be, and body 16 is recessed within the ceiling or wall and is disposed at the angle "a" with respect to flange 18. Flange portion 20 can be of any suitable conventional configuration which is adapted to attach the air diffuser to the duct work of a ventilation system in an installation. The particular configuration of flange 20 is not essential for purposes of this invention and will not be described in detail, it being well understood in the art.

Frame segments 10 and 12 also include mitered edges 28 and 30, respectively, which permit the two segments to be butted together in a fashion such that edges 28 and 30 are in abutment, as shown in FIGS. 4 and 5, and both segments 10 and 12 are disposed at the louver angle. It will be appreciated that the amount of louver angle "a" depends on the design criteria of the diffuser.

Frame segments 10 and 12 include a restricted passageway 32 on the side opposite surface 17, passageway 32 being unexposed to the room when the diffuser is installed. Restricted passageway 32 is characterized by a flat surface 34 opposite exposed face 17 and, in addition, two substantially L-shaped projecting legs 38 and 40. Projection 38 is comprised of a leg 42 extending substantially normal to face 34 and a second leg 44 spaced from and extending substantially parallel to face 34. Leg 40 is substantially the same as leg 38 having leg 46 extending normal to face 34 and a leg 48 spaced from and extending parallel to face 34. Legs 44 and 48 face each other and provide opposed surfaces between which restricted passageway 32 is defined. Restricted passageway 32 extends the length of the frame segments and is provided for receipt of the connector member which will now be described.

Connector member 50 as shown in FIG. 1, in an exploded plan view, includes two leg portions 52 and 54. The connector is chevron shaped and legs 52 and 54 have a compound angular relationship, i.e., they are angularly related to each other about two axes. More specifically, and with reference to a first plane, the plane of the paper in FIG. 1 or parallel to flange 18, a basic chevron angle B is formed in a direction parallel to that plane. Angle B is determined by the miter joint between the segments. The second angle is the angle "C" at which the legs are disposed to that plane in FIG. 2. Angle "c," as shown in FIG. 2, is substantially equal to angle "a." At the juncture of legs 52 and 54 of connector 50, a rib 56 is provided, rib 56 allowing for clearance of possible burrs which may be formed when the louver extrusions for frame segments 10 and 12 are cut to form the miter joint.

Legs 52 and 54 of connector 50 each have a nonplanar configuration in transverse cross section, this configuration is provided by an upset rib portion 58 clearly shown in FIG. 2. Rib portion 58 is provided so that the initial width of each leg of the connector member is less than the width of the restricted passages 32 on the frame segments 10 and 12. That is, less than the distance between projections 38 and 40 so that the connector member is easily installed in the passageway as shown in FIG. 2. With the connector member positioned as in FIG. 2, rib portion 58 is flattened against surface 34 of restricted passageway 32 to wedge both legs of the connection between the opposed projections 38 and 40 of the restricted passageway 32. The expanded width of the connector legs is clearly illustrated in FIG. 3. With both legs so flattened or deformed from their initial position, a secure and positive mechanical interlock is provided between the lower segments.

It will also be noted that the connector member is cut out at areas 24 and 26. With this arrangement the inner edges of rib portions 58 are separated from the central portion of the chevron substantially over the entire length of the edges. This facilitates forming portions 58 initially and the flattening thereof to form the wedge connection as will now be described.

Preferably, rib portions 58 of connector member 50 are offset from the longitudinal center of each leg of the connector member 50 adjacent one edge of the connector member, i.e., corresponding edges. With this arrangement and the compound angular relation between the connector member legs, the expansion of rib portions 58 in the restricted passages will be toward each other and at an angle to the butt joint between the segments. This produces a force tending to wedge the frame segments together along their mitered edges 28 and 30 to provide a tight or hairline miter joint and to maintain that joint in service.

In practice, frame segments 10 and 12 are positioned adjacent each other with mitered edges 28 and 30 butted together. The connector member is then inserted in restricted passage 32 as shown in FIG. 2 with its lower leg edges abutting lower projections 38. Using projections 38 as a base, rib portions 58 are then flattened as shown in FIGS. 3-5 producing both the positive and rigid connection between the frame segments 10 and 12 and the force urging the segments together along their miter joint.

The method of connection proposed by this invention provides a secure and rigid mechanical connection between two frame segments. The connection is extremely simple to achieve and can be used with anodized extruded aluminum members without detracting from the external appearance. The novel chevron-shaped connector member can be simply stamped using mass production techniques and the connection can be made at the factory or in the field with equal facility. It will be appreciated that this invention can be used to mechanically join any louver structural segments, and regardless of their shape and relative positioning.

Although but one embodiment of the present invention has been illustrated and described, it will be apparent to those skilled in the art that various changes and modifications may be made therein without departing from the spirit of the invention as described.

We claim:

1. In combination:

first and second frame segments arranged at a predetermined louver angle, said segments also being mitered to form a miter joint therebetween;

means defining a restricted passage on said frame segments for receiving a connector member, said means including opposed surfaces extending along the length of said segments for restraining said connector member therebetween, said opposed surfaces having a preselected spacing therebetween;

a connector member extending between said frame segments into each of said passages, said connector member characterized by having two generally elongated leg members having a compound angular relationship therebetween in that said legs are arranged with a basic chevron angle therebetween and are further disposed at an angle to each other corresponding to said louver angle;

said leg members each initially having a transverse raised rib portion offset laterally from the longitudinal axis of said leg member which rib portion is deformed, after said leg members are placed in said passage, to wedge the outer edges of said leg members between the opposed surfaces of said passages to provide a connection between said frame segments; and means defining an opening adjacent said rib portions intermediate said leg members and extending inwardly generally coextensive with said rib portions so that the edges of said rib portions adjacent said central portion are generally separate from said central portion to permit said leg members to expand, when said rib portions are deformed, in a manner tending to urge said frame segments together along their miter edges.

2. The combination of claim 1 wherein said central portion further includes a raised rib portion generally overlying said miter joint.

* * * * *